Oct. 6, 1953 — J. J. DALY — 2,654,447
SLACK ADJUSTING DEVICE FOR AIR BRAKES
Filed Feb. 23, 1950 — 2 Sheets-Sheet 1
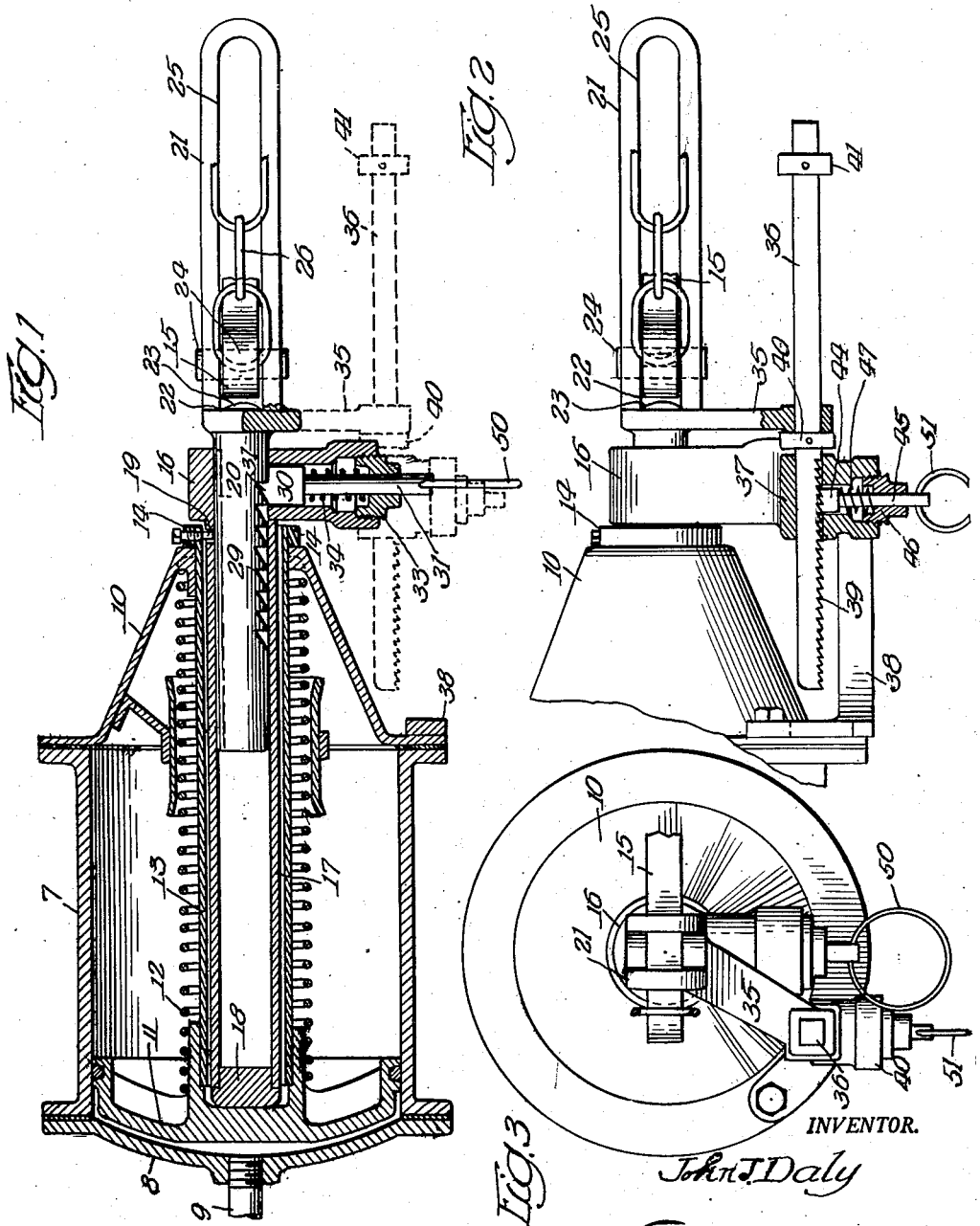
INVENTOR.
John J. Daly
By: Fred Gerlach, his Atty.

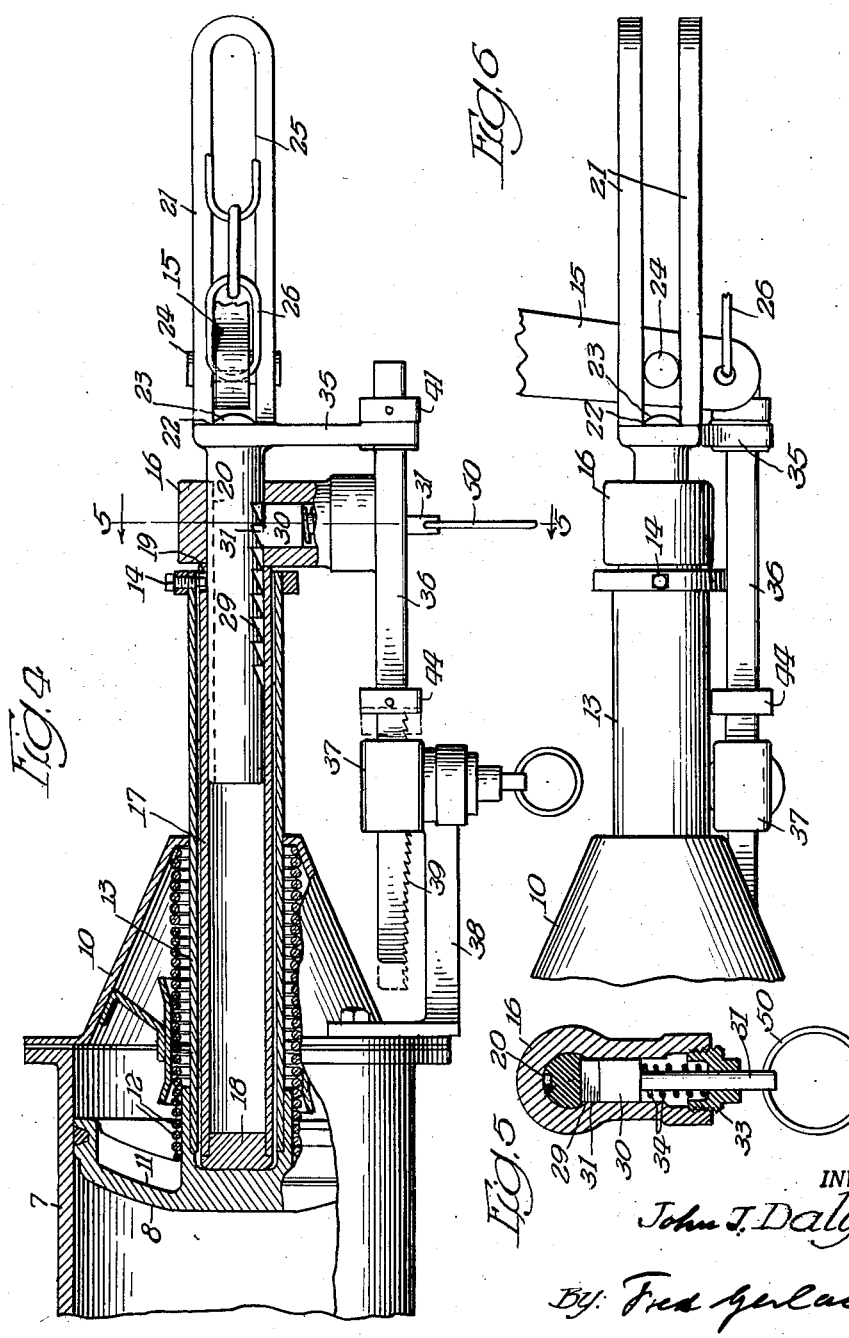

Patented Oct. 6, 1953

2,654,447

UNITED STATES PATENT OFFICE 2,654,447

SLACK ADJUSTING DEVICE FOR AIR BRAKES

John J. Daly, Cheyenne, Wyo.

Application February 23, 1950, Serial No. 145,757

9 Claims. (Cl. 188—200)

The invention relates to devices in an air brake system for adjusting the slack in the connections in the rigging for operating the brake-shoes or the clearance between the brake-shoes and the car wheels.

One object of the invention is to provide an improved slack adjusting device for this type of brake system which will be automatically adjusted to compensate for the variations in the slack which result from wear on the brake-shoes.

Another object of the invention is to provide a slack adjusting device which is efficient in operation and simple in construction.

Other objects of the invention will appear from the detailed description.

The invention consists in the several novel features hereinafter set forth and more particularly defined by claims at the conclusion hereof.

In the drawings:

Fig. 1 is a vertical longitudinal section of an air brake cylinder, with a slack adjusting device embodying the invention, parts being shown in elevation;

Fig. 2 is a side elevation, parts being shown in section;

Fig. 3 is an end view;

Fig. 4 is a side elevation, parts being shown in section, the piston being shown at the end of an outstroke;

Fig. 5 is a section taken on line 5—5 of Fig. 4;

Fig. 6 is a partial plan view.

The invention is exemplified with an air cylinder of standard construction to which air is supplied for applying the brakes and from which it is exhausted for releasing the brakes, as well understood in the art. This cylinder is usually mounted on the truck frame. The air cylinder comprises a body 7, a head 8, secured to and closing one end of the cylinder and to which an air pipe 9 is connected, a head 10 closing the opposite end of the cylinder, a piston 11 slidable in body 7 and operable to apply the brakes by air admitted through pipe 9, a spring 12 for retracting the piston when air is exhausted from the cylinder for releasing the brakes and a hollow tubular stem 13 fixed to piston 11 and extending through the head 10. A stop collar 14 limits the inward movement of the piston 11 and stem 13.

The invention is used with brake rigging of standard construction for applying and releasing brake-shoes, which includes a floating lever 15 and suitable devices for operating all of the brake-shoes on a car truck. This rigging is adapted to apply the brake-shoes to the car wheels when lever 15 is shifted by an outward stroke of piston 11 and to release the brake-shoes when said lever is released. Since the construction of this rigging is well known in the art, it has not been deemed necessary to illustrate and describe it in detail.

A collar or head 16 is welded to the outer end of a thrust sleeve 17 which is slidably mounted in the piston stem and has welded to its inner end an abutment plug 18 which is shiftable by the piston during its outstroke to set the brakes. A screw 19 in stop collar 14 extends into a hole in sleeve 17 for retracting said sleeve during the instroke of the piston produced by spring 12.

The slack adjusting device comprises an auxiliary stem 20 which slidably fits in the bore of collar 16 and the thrust sleeve 17. A bifurcated slotted loop 21 is welded at 22 to the outer end of stem 20. Lever 15 extends through a longitudinal slot 25 in the members of loop 21 and is engageable by an abutment 23 on stem 20 for imparting brake-applying strokes to said lever during the outstrokes of piston 11. A stud 24 on lever 15 extends between the members of loop 21. A chain 26 which is shiftable by a hand-operable device of standard construction is connected to lever 15 for operating the brake rigging independently of the air cylinder.

The auxiliary stem 20 is provided with a series of ratchet teeth 29. A dog 30 is slidably mounted in collar 16 and provided with a ratchet tooth 31 for engaging the teeth 29 on the stem 20 and positively shifting said auxiliary stem outwardly during the outstrokes of thrust sleeve 17 and piston 11. Dog 30 is provided with a stem 31 which extends through a screw plug 33 in the lower end of collar 16. A spring 34 is applied between plug 33 and dog 30 for constantly urging said dog into engaging relation with the teeth 29 on stem 20. The dog 30 and ratchet teeth 29 permit stem 20 to slide outwardly in collar 16 when said stem is positively arrested against inner movement, as hereinafter described. During each stroke of piston 11 produced by the delivery of air into the cylinder the piston will engage plug 18 and impart an outward stroke to lever 15 through thrust sleeve 17, collar 16, dog 30 and auxiliary stem 20, the length of the strokes being adequate to move lever 15 to apply the set brake-shoes against the car wheels.

In practice the brake-shoes become worn from use and this results in an increase of clearance or slack between the brake-shoes and the car wheels. In order to compensate for this increase, the auxiliary stem 20 is shiftable outwardly in the thrust sleeve 17 to increase the distance between the abutment 23 which shifts the brake-operating lever 15 and the piston for latching the auxiliary piston in different positions relatively to the thrust sleeve 17, by means of the ratchet dog 30 and ratchet teeth 29.

The mechanism for effecting this adjustment of the auxiliary stem 20 relatively to the thrust sleeve 17, comprises an arm 35 rigid with the auxiliary stem 20, a casing 37 in which a rod 36 is axially slidable in parallelism with the stem 20, a pair of abutment collars 40 and 41 fixed in predetermined spaced relation on rod 36, a series of ratchet teeth 39 on the inner end of rod 36, a dog 44 provided with teeth engaging the teeth 39 on rod 36, and a spring 47 which urges dog 44 into engaging relation with said teeth 39. Dog 44 is provided with a stem 45 which is slidably mounted in a screw plug 46 in casing 37. A bracket 38 integral with casing 37 supports said casing in fixed relation to the brake cylinder. Dog 44 and ratchet teeth 39 permit outward movement of rod 36 relatively to casing 37 and are adapted to latch the rod and the abutment collars 40 and 41 thereon in their outwardly shifted positions.

Sleeve 17 functions as a stem operated by the piston for positively and directly shifting the collar 16, auxiliary stem 20, and arm 35 during the outstrokes of the piston 11. Arm 35 is adapted to engage abutment collar 41 and shift rod 36 outwardly at the end of an outstroke of piston 11 and lever 15 when the length of the outstroke is increased as the result of slack or wear on the brake-shoes. Such shift of rod 36 will move collar 40 outwardly into position to restrict the inward movement of arm 35 during the following instroke of the piston. At the end of said succeeding instroke, abutment collar 40 will arrest arm 35 and auxiliary stem 20 relatively to thrust sleeve 17 and during the continued inward movement of the piston, auxiliary stem 20 will be shifted outwardly relatively to thrust sleeve 17 a distance corresponding substantially to said increase in the outstroke of the piston, and dog 30 and teeth 29 will latch the auxiliary stem in its outwardly shifted position. During the succeeding outstroke of the piston the auxiliary stem will be operated in its adjusted position, as illustrated in Fig. 4.

A ring 50 is connected to the lower end of stem 31 for releasing dog 30 to reset the auxiliary stem 20 in the thrust sleeve 17 and collar 16. A ring 51 is connected to the lower end of the stem 45 for disengaging dog 44 from the teeth 39 of rod 36 for resetting the rod 36 and abutments 40 and 41 when worn brake-shoes are replaced.

Abutment collars 40 and 41 are spaced apart a sufficient distance to permit arm 35 to move between them while the throw of lever 15 is sufficient for normal clearance between the brake-shoes and the car wheels, that is, before the brake-shoes have become worn so that there will be no change in the outward adjustment of auxiliary stem 20 in thrust sleeve 17 until said clearance is increased.

During each outstroke of the piston 11 the coaxial sleeve 17 and auxiliary stem 20, abutment 23 on stem 20 will engage and impart a stroke of sufficient length to lever 15 for setting the brakes while arm 35 moves between collars 40 and 41 without shifting rod 36. During each instroke or return of piston 11 by spring 12, pin 14 will retract sleeve 17 and collar 16 and the auxiliary stem 20 will be retracted with piston 11, stem 13, sleeve 17, and collar 16, by the dog 30, the magnitude of spring 34 being sufficient to prevent dog 30 from slipping past teeth 29.

The operation of the slack adjusting device will be as follows: When the clearance or slack between the brake-shoes and the car wheels has been increased as the result of wear of the shoes, and it becomes desirable to adjust the auxiliary stem outwardly to compensate for the increased clearance or slack and air is admitted into the cylinder, an outstroke will be imparted to piston 11, sleeve 17, collar 16, dog 30 and stem 20 for shifting lever 15 until the brake-shoes engage the car wheels. Said outstroke will be greater than the stroke when there is normal clearance. This increase in the outstroke of the piston will cause arm 35 on the auxiliary stem 20 to engage abutment collar 41 at the end of the outstroke and shift said collar a distance corresponding to the increase in the stroke. Rod 36 and collar 40 will be simultaneously shifted outwardly relatively to the cylinder and dog 44 and ratchet teeth 39 will latch the rod 36 and collar 40 in their shifted position. During the following instroke of the piston, collar 16, dog 30 and auxiliary stem 20 will move inwardly with sleeve 17 and stem 13 until arm 35 engages the collar 40 in its latched position. Near the end of the instroke arm 35 will be arrested against further inward movement by collar 40 and dog 30 in collar 16 will slip into engagement with the succeeding ratchet tooth 29 to latch the auxiliary stem in the position into which the stem 20 has been shifted relatively to collar 16 and thrust sleeve 17. During the succeeding outstroke of piston 11, the auxiliary stem 20 will be positively operated in its extended position to operate lever 15 to compensate for the increased clearance, as illustrated in Fig. 4. As the wear increases, the operation of the slack adjusting device will be repeated to cause dog 30 to successively engage the teeth 29 on the auxiliary stem 20 and compensate for the additional clearance or slack. When the brake-shoes are worn out, they will be replaced by new brake-shoes and the dog 30 will be retracted by ring 50 to permit its outermost tooth 29 to be engaged by dog 30 and dog 44 will be retracted by ring 51 to permit the rod 36 to be set into its normal position, as illustrated in Fig. 2.

When it is desired to set the brakes by hand, the connection 16 will be manually shifted and stud 24 will slide in slot 25 in the loop 21 and permit lever 15 to be shifted to set and release the brakes independently of the auxiliary stem 20 and the air cylinder. As a result of this construction, the piston is operated to shift the lever 15 to provide a uniform predetermined clearance between the brake-shoes and the car wheels when the brakes are released, and this clearance is maintained notwithstanding variations resulting from the wear of the brake-shoes or slack in the brake rigging.

The invention exemplifies an improved simple and efficient device for adjusting the slack and automatically varying the strokes of the brake-operating lever 15 to compensate for wear on the brake-shoes.

The invention is not to be understood as restricted to the details set forth since these may be modified within the scope of the appended claims without departing from the spirit and scope of the invention.

Having thus described my invention, what I claim as new and desire to secure by Letters Patent is:

1. In an air brake system for railway cars, the combination with an air cylinder, a piston slidable in the cylinder, a piston-operable stem extending through one end of the cylinder, and a brake shifting lever; of an auxiliary stem coaxial with and mounted to slide outwardly in and relatively to the piston-operable stem, provided with ratchet teeth, and having its outer end adapted to shift said lever; a spring-pressed dog movable outwardly by the piston-operable stem and engaging the ratchet teeth for shifting the auxiliary stem outwardly and permitting its outward movement relatively to the piston; and means for shifting the auxiliary stem outwardly relatively to the piston-operable stem during an instroke of the piston, responsively to an increase in the outstroke of the lever resulting from an increase in slack, the dog being adapted to latch the auxiliary stem in said outwardly shifted position, said means including a slidably mounted rod, abutments on the rod, a ratchet device for latching the rod in its shifted position and means on the auxiliary stem for engaging one of the abutments and moving the rod outwardly during the outstroke of the piston and for engaging the other abutment during the instroke of the piston for shifting the auxiliary stem outwardly in the piston-operable stem into position to be latched by a succeeding tooth on the auxiliary stem.

2. In an air brake system for railway cars the combination with an air cylinder, a piston slidable in the cylinder, a piston-operable stem extending through one end of the cylinder, and a brake shifting lever; of an auxiliary stem coaxial with and mounted to slide outwardly in and relatively to the piston-operable stem, provided with ratchet teeth, and having its outer end adapted to shift said lever; a spring-pressed dog movable outwardly by the piston-operable stem and engaging the ratchet teeth for shifting the auxiliary stem outwardly and permitting its outward movement relatively to the piston; an arm on the auxiliary stem; and means for shifting the arm outwardly relatively to the piston-operable stem during an instroke of the piston, responsively to an increase in the outstroke of the lever resulting from an increase in slack, the dog being adapted to latch the auxiliary stem in said outwardly shifted position, said means including a slidable mounted rod, abutments on the rod, a ratchet device for latching the rod in its shifted position and an arm on the auxiliary stem for engaging one of the abutments and moving the rod outwardly during the outstroke of the piston and for engaging the other abutment during the instroke of the piston for shifting the auxiliary stem outwardly in the piston-operable stem into position to be latched by the dog to a succeeding tooth on the auxiliary stem.

3. In an air brake system for railway cars the combination with an air cylinder, a piston slidable in the cylinder, a piston-operable stem extending through one end of the cylinder, and a brake-shifting lever; of an auxiliary stem extending into and mounted to slide outwardly relatively to the piston-operable stem, having its outer end adapted to shift said lever, and provided with ratchet teeth; a collar rigidly secured to said stem, a spring-pressed dog mounted in said collar, said dog being movable with the piston-operable stem and engaging the ratchet teeth for shifting the auxiliary stem outwardly and permitting its outward movement relatively to the piston; an arm on the auxiliary stem; a bracket mounted on the cylinder; a casing supported by said bracket; a slidably supported rod provided with ratchet teeth and extending through said arm and casing; a spring-pressed dog mounted in said casing for engaging the teeth on the rod; an abutment on the rod engageable by the arm for shifting said rod outwardly responsively to an increase in the outstroke of the piston resulting from an increase in slack; a second abutment on the rod for arresting the arm and shifting the auxiliary stem outwardly relatively to the piston during an instroke of the piston; and a dog for latching the rod against inward movement.

4. In an air brake system for railway cars the combination with an air cylinder, a piston slidable in the cylinder, a piston-operable stem extending through one end of the cylinder, and a brake-shifting lever; of a collar, a sleeve slidable in the piston-operable stem and secured to the collar; an auxiliary stem slidably mounted in said sleeve, having its outer end operatively connected to said lever, and provided with ratchet teeth; a spring-pressed dog mounted in the collar and engaging the ratchet teeth for shifting the auxiliary stem outwardly and permitting its outward movement relatively to the piston stem; and means for shifting the auxiliary stem outwardly relatively to and during an instroke of the piston responsively to an increase in the outstroke of the lever resulting from an increase in slack, the dog being adapted to latch the auxiliary stem in its outwardly shifted position relatively to the piston-operable stem.

5. In an air brake system for railway cars the combination with an air cylinder, a piston slidable in the cylinder, a hollow stem on said piston and extending through one end of the cylinder, and a brake-shifting lever; of a sleeve coaxially slidable in the piston stem and shiftable by the piston, an auxiliary stem extending into and mounted to slide coaxially in said sleeve, having its outer end adapted to shift said lever, and provided with ratchet teeth; a spring-pressed dog mounted to move with the sleeve and engaging the teeth on the auxiliary stem for shifting the lever outwardly and permitting its outward movement relatively to the sleeve; and means for shifting the auxiliary stem outwardly during an instroke of the piston responsively to an increase in the outstroke of the lever resulting from an increase of the slack, the dog being adapted to latch the auxiliary stem in said outwardly shifted position.

6. In an air brake system for railway cars the combination with an air cylinder, a piston slidable in the cylinder, a hollow stem on said piston and extending through one end of the cylinder, and a brake-shifting lever; of a thrust sleeve coaxially slidable in the piston stem and shiftable by the piston, an auxiliary stem extending into and mounted to slide coaxially in said thrust sleeve, having its outer end adapted to shift said lever, and provided with ratchet teeth; a spring-pressed dog mounted to move with the sleeve and engaging the teeth on the auxiliary stem for shifting the lever outwardly and permitting its outward movement relatively to the thrust sleeve; an arm on the auxiliary stem; and means for shifting the arm on the auxiliary stem outwardly during an instroke of the piston responsively to an increase in the outstroke of the lever resulting from an increase of the slack, the dog being adapted to latch the auxiliary stem in said outwardly shifted position.

7. In an air brake system for railway cars the the combination with an air cylinder, a piston slidable in the cylinder, a hollow stem on said piston and extending through one end of the cylinder, and a brake-shifting lever; of a thrust sleeve coaxially slidable in the piston-stem and shiftable by the piston, a collar on the outer end of said sleeve, an auxiliary stem extending into and mounted to slide coaxially in said sleeve, having its outer end adapted to shift said lever, and provided with ratchet teeth; a spring-pressed dog mounted in the collar and engaging the teeth on the auxiliary stem for shifting the lever outwardly and permitting its outward movement relatively to the thrust sleeve; an arm on the auxiliary stem; a rod extending through said arm and slidable relative thereto, abutments on the rod and engagable by the arm, a ratchet device for shifting the arm on the auxiliary stem outwardly during an instroke of the piston responsively to an increase in the outstroke of the lever resulting from an increase of the slack, the dog being adapted to latch the auxiliary stem in said outwardly shifted position.

8. In an air brake system for railway cars the combination with an air cylinder, a piston slidable in the cylinder, a piston-operated stem extending through one end of the cylinder, and a brake shifting lever, of an auxiliary stem coaxial with and mounted to slide outwardly in and relatively to the piston-operated stem, provided with ratchet teeth, and having its outer end adapted to shift said lever, a spring-pressed ratchet dog engaging the teeth on the auxiliary stem and mounted on and reciprocable with the piston-operated stem, the stems and dog having an increase of outstroke upon an increase of slack, adjustable stop means for limiting inward movement of the auxiliary stem in the piston-operated stem during the instroke of the piston, and an arm on the auxiliary stem movable upon a predetermined increase in the outstroke of the piston for adjusting the stop means during the outstroke of the piston to shift the auxiliary stem relatively to the piston-operated stem into position to take up slack in the brake connections during the latter part of the instroke of the piston and to be latched in said position by the dog.

9. In an air brake system for railway cars the combination with an air cylinder, a piston slidable in the cylinder, a piston-operated stem extending through one end of the cylinder, and a brake shifting lever, of an auxiliary stem coaxial with and mounted to slide outwardly in and relatively to the piston-operated stem, provided with ratchet teeth, and having its outer end adapted to shift said lever, a spring-pressed ratchet dog engaging the teeth on the auxiliary stem and mounted on and reciprocable with the piston-operated stem, the stems and dog having an increase of outstroke upon an increase of slack, adjustable stop means for limiting inward movement of the auxiliary stem in the piston-operated stem during the instroke of the piston, an arm on and operated by the auxiliary stem upon a predetermined increase in the outstroke of the piston, and an element engageable by the arm for adjusting the stop means during the outstroke of the piston to shift the auxiliary stem relatively to the piston-operated stem into position to take up slack in the brake connections during the latter part of the instroke of the piston and to be latched in said position by the dog.

JOHN J. DALY.

References Cited in the file of this patent
UNITED STATES PATENTS

| Number | Name | Date |
|---|---|---|
| 704,508 | Burgess | July 15, 1902 |
| 713,757 | Fisher | Nov. 18, 1902 |
| 1,749,018 | Campbell | Mar. 4, 1930 |